United States Patent [19]

Kane et al.

[11] 4,042,360
[45] Aug. 16, 1977

[54] PRODUCTION OF INORGANIC FIBERS WITH INORGANIC CORES

[75] Inventors: John L. Kane; George R. Machlan, both of Newark, Ohio

[73] Assignee: Owens-Corning Fiberglas Corporation, Toledo, Ohio

[21] Appl. No.: 626,952

[22] Filed: Oct. 29, 1975

Related U.S. Application Data

[62] Division of Ser. No. 557,721, March 12, 1975, Pat. No. 4,013,435.

[51] Int. Cl.$^2$ ............................................. C03B 37/02
[52] U.S. Cl. .................................... 65/11 W; 65/1; 118/410; 118/411; 118/420; 425/94
[58] Field of Search ............ 65/3 R, 3 B, 3 C, 11 W, 65/1, 2; 118/410, 411, 419, 420; 425/66, 94; 427/385, 386

[56] References Cited

U.S. PATENT DOCUMENTS

| 2,772,518 | 12/1956 | Whitehurst et al. | 65/11 W X |
|---|---|---|---|
| 2,963,739 | 12/1960 | Whitehurst et al. | 65/11 W X |
| 3,323,941 | 6/1967 | Dijk | 118/410 X |
| 3,653,860 | 4/1972 | Smith et al. | 65/11 W |
| 3,718,448 | 2/1973 | Drummond et al. | 65/3 C |
| 3,846,097 | 11/1974 | Russell | 65/3 C X |

FOREIGN PATENT DOCUMENTS

| 1,036,607 | 7/1966 | United Kingdom | 65/1 |

*Primary Examiner*—Robert L. Lindsay, Jr.

*Attorney, Agent, or Firm*—Ronald C. Hudgens; Allen D. Gutchess

[57] ABSTRACT

The production of organic fibers with inorganic cores is set forth. Inorganic, such as glass, fibers are attenuated from a bushing and then covered individually or in small groups with organic sheaths. With individual fibers, rows or orifices in a bottom of the bushing are staggered so as to equally space the filaments. The applicator for applying the organic sheaths has one groove for each of the individual fibers for applying the organic material and for maintaining the fibers separated therebelow. The applicator can be mounted in a manner such that it can be retracted from an operating position in engagement with the filaments when the bushing operation is stopped, raised to a position near the bushing bottom, and moved into engagement with the fibers again to automatically place one fiber in each groove when the bushing is restarted. The applicator is then moved down to the operating position again when the bushing is back in normal operation. An oven is located below the applicator for curing the organic sheaths before the fibers are brought together. The oven is mounted on tracks and has a side slot to enable the oven to be moved from a position to one side of the fibers to a position in which the fibers are surrounded. A gathering wheel below the oven collects composite fibers and applies a size to them; the composite fibers are then wound on a collet or other suitable means. For increased production, two bushings and two of the special applicators can be employed.

19 Claims, 19 Drawing Figures

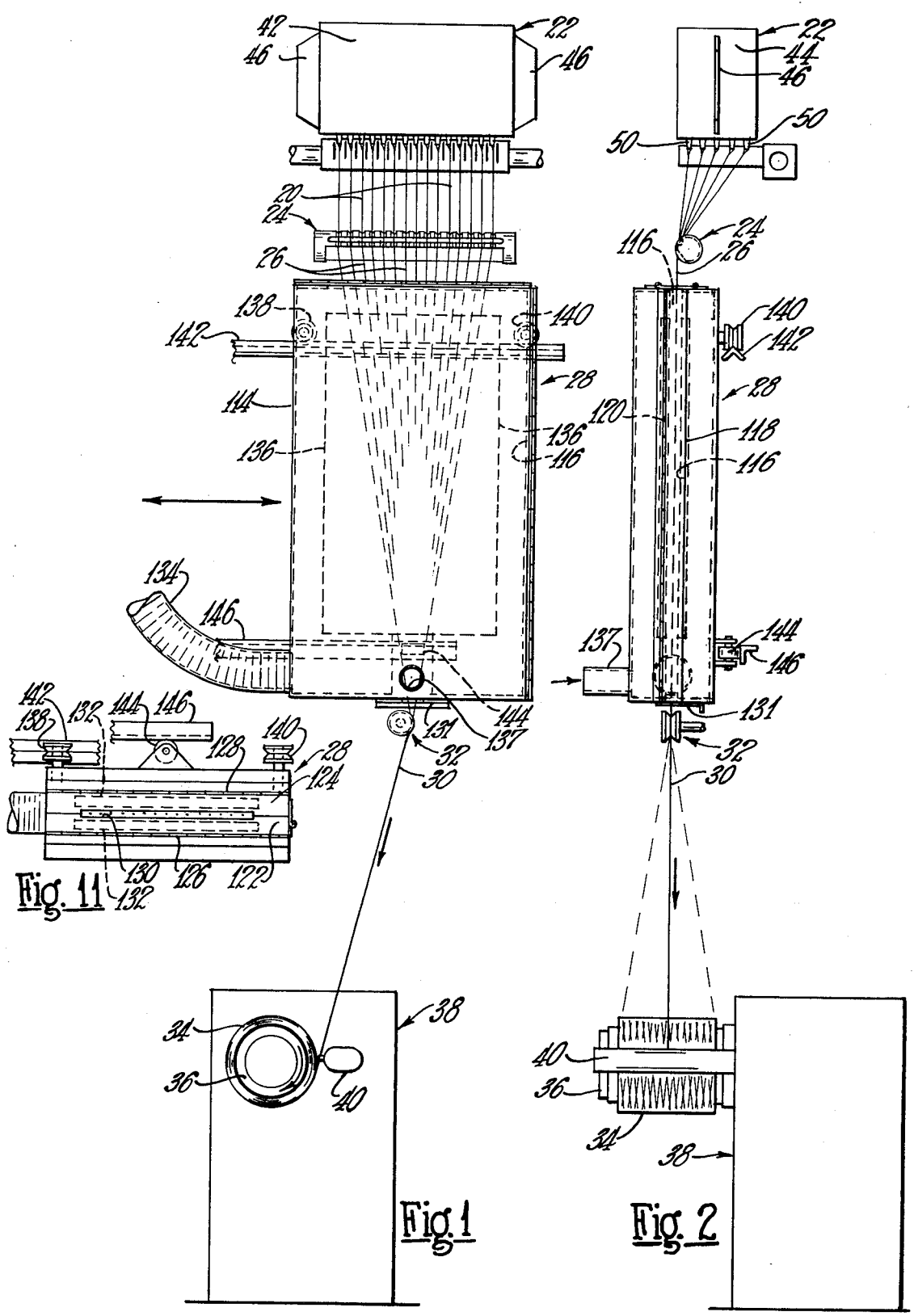

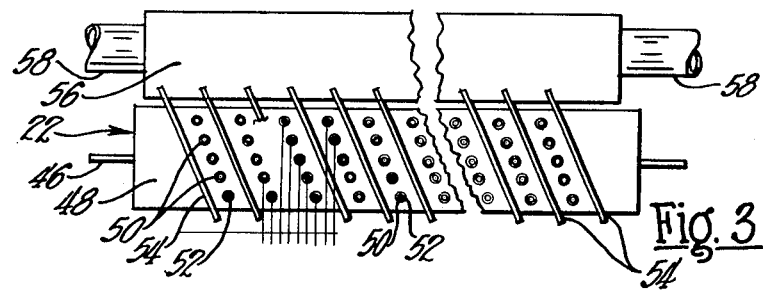
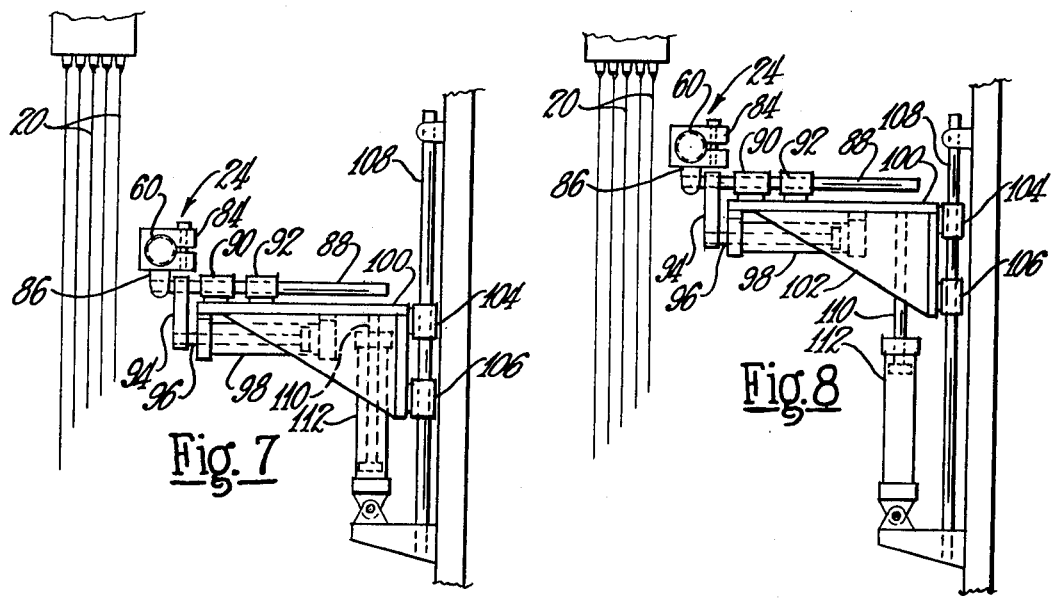
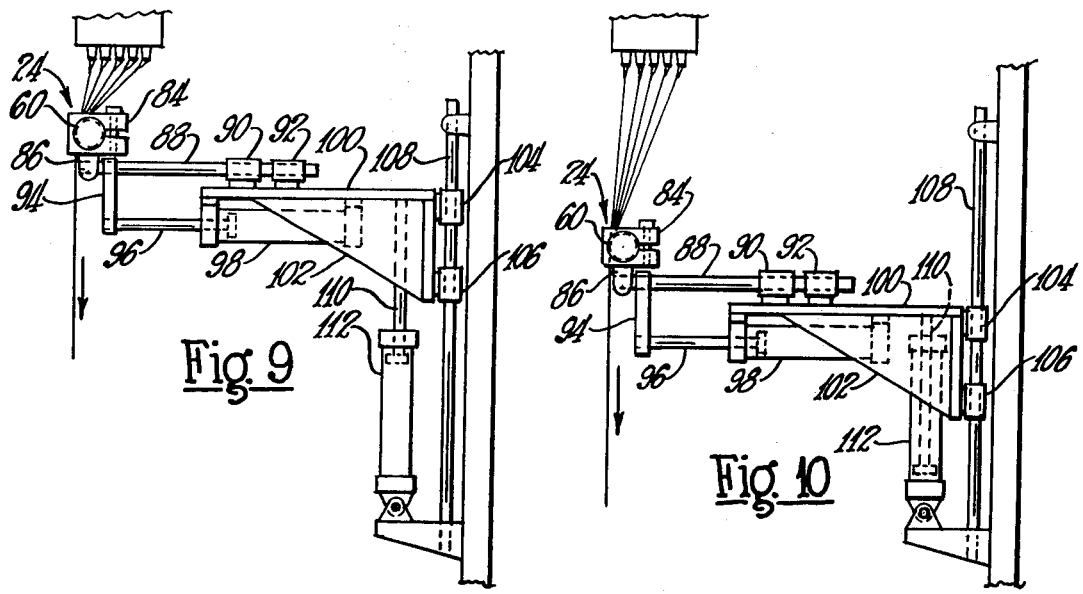

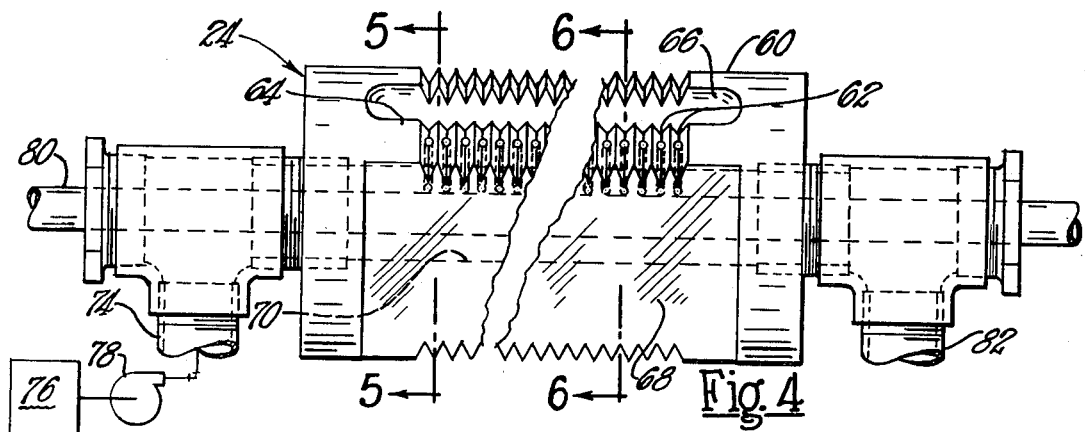
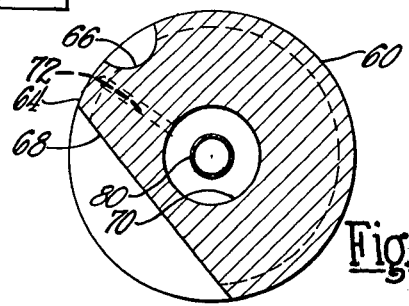
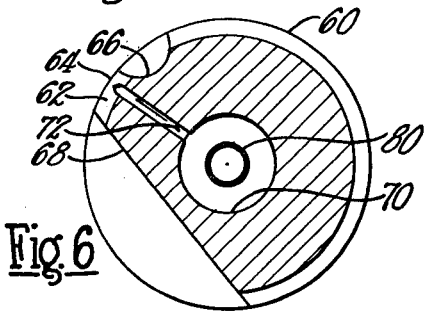
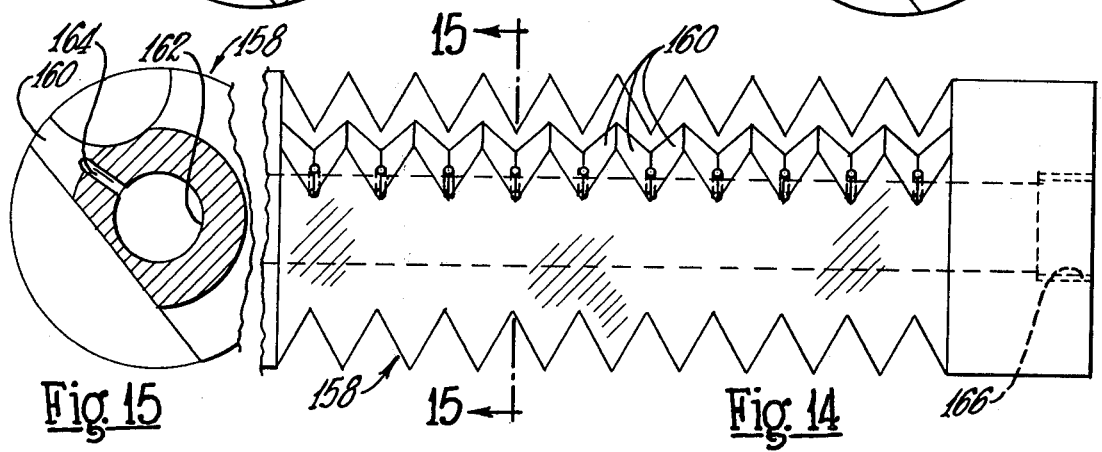
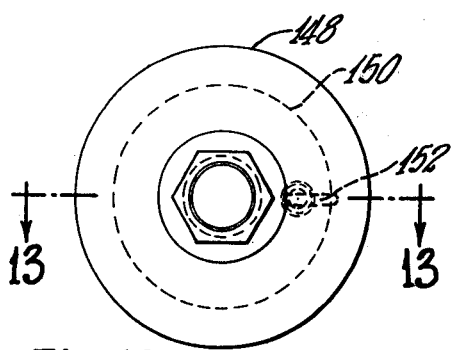
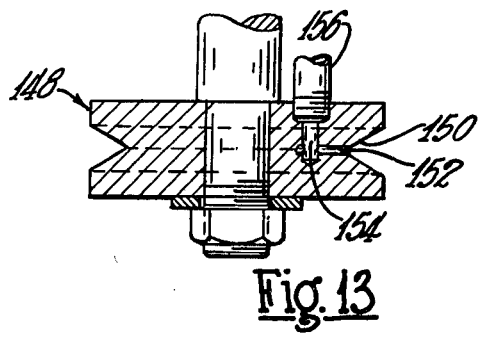

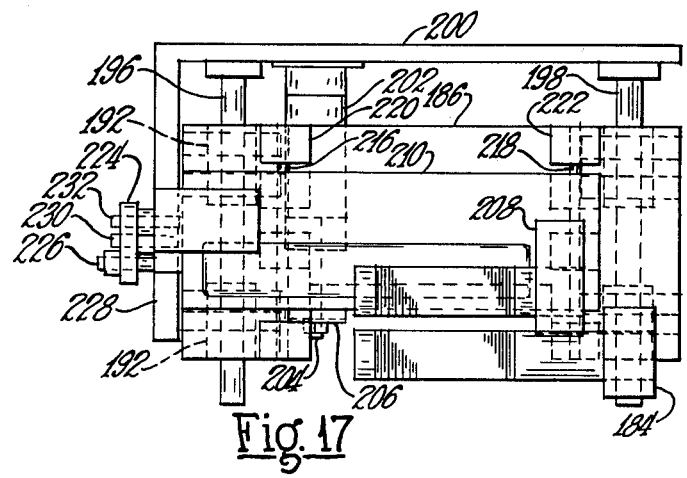
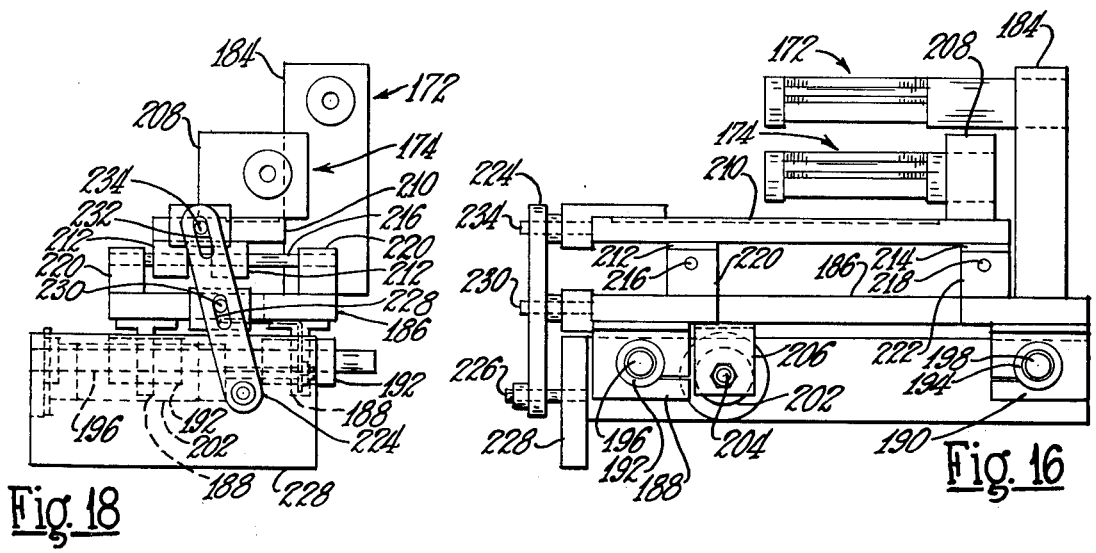
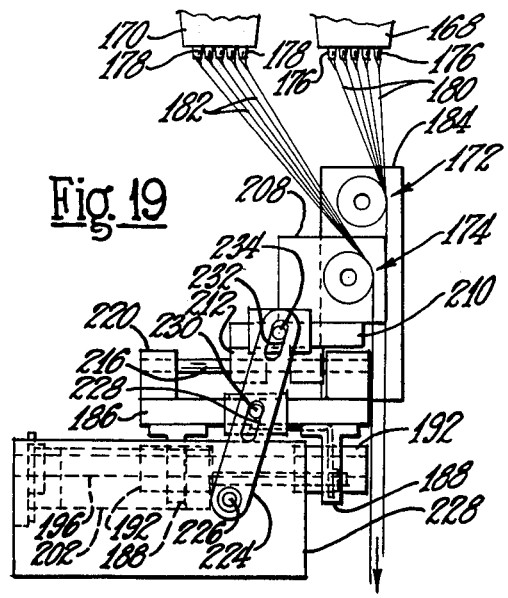

PRODUCTION OF INORGANIC FIBERS WITH INORGANIC CORES

This is a division of application Ser. No. 557,721 filed Mar. 12, 1975, now U.S. Pat. No. 4,013,435.

This invention relates to the production of composite fibers including inorganic cores with organic sheaths therearound.

The composite fiber produced according to the invention has a sheath of organic material around a core of inorganic material so that the fiber has advantages and desirable characteristics of both materials. The inorganic core provides high strength and dimensional stability which cannot be obtained in an organic fiber alone. The organic sheath enables the fiber to be dyed and, in fact, a color can be added at the applicator where the sheath is applied. The fiber also can be heat-set and is readily adaptable to textile processes since the sheath reduces wear on guide eyes and various other components of the textile apparatus as compared to inorganic fibers, such as glass fibers, used alone. The composite fiber can also be carded more easily than glass fibers. The composite fiber has a lesser tendency to break than a bare glass fiber since the composite fiber has greater resistance to abrasion and cannot be bent as far as an uncoated glass fiber, which reduces or substantially eliminates breakage caused by excess bending. The composite fibers can be used wherever conventional textile fibers are used and can be made into cloth, rugs, tufts, and employed in twist frames. Depending on the organic material employed, the surfaces of the composite fibers can be either smooth or rough and beady.

The present invention provides apparatus for producing such composite fibers or filaments on a sufficient volume basis that the fibers can be employed in commercial applications. Where the inorganic fibers of the core are glass fibers, and they are to be individually coated, they can be attenuated from molten glass in a bushing through staggered orifices in the bushing bottom. The staggering is such that lines taken centrally through the orifices and perpendicular to a line parallel to the longitudinal extent of the bushing bottom are equally spaced in all instances. An applicator below the bushing bottom has a multiplicity of vertically-extending grooves or notches therein, one for each orifice and each fiber. The grooves of the applicator not only enable each filament to be fully coated to form the organic sheath therearound, but also maintain the composite filaments physically separated below the applicator. The filaments, however, can also be coated in small groups or bundles, with the applicator having fewer but larger grooves, one for each group. The applicator also has a central manifold with passages for supplying the organic coating material to each of the grooves.

From time-to-time, the bushing operation must be restarted as when fibers or filaments being attenuated therefrom break or are otherwise interrupted. Ordinarily, it would be a monumental task to manually feed a filament back into each of the grooves of the applicator for each restarting operation. However, it has been found that the applicator can be mounted on guides in a manner such that the applicator can be moved from an operating position to a retracted position and, subsequently, into contact with the filaments immediately below the bushing bottom where the filaments are maintained in their spaced relationship near the orifices. The filaments can thereby be aligned with and received in their corresponding grooves in the applicator and the applicator can then be moved downwardly, while maintaining engagement with the filaments, to the operating position once again.

In order to dry or cure the organic coating before the composite filaments are gathered together, a long upright oven with a vertical passage therein is located immediately below the applicator. The oven has heating panels on both sides of the fan of filaments below the applicator to apply a substantial amount of heat in a short space and time. The oven is equipped with a vertically-extended slot at one edge thereof extending the length of the oven passage and the oven is also mounted on tracks. With this arrangement, the oven can be moved between an out-of-the-way position to one side of the applicator and an operating position in which the oven is moved into the filament path, at which time the filaments are received through the slot of the oven into the oven passage.

A gathering wheel or similar gathering means is located below the oven and is equipped with a passage for applying size to the composite fibers as they are gathered together in a groove of the wheel. Subsequently, the resulting strand of composite fibers can be wound or packaged on a collet or other suitable apparatus.

To further increase production to provide an even greater commercially-practical product, two tip sections of a single bushing or of two separate bushings can be employed in side-by-side relationship, each with its own applicator. The applicators are mounted on a supporting assembly by means of which both applicators can be simultaneously moved between operating positions, retracted positions, and upper positions adjacent the tip sections for engaging the fibers with the individual applicator grooves when the tip sections are restarted.

It is, therefore, a principal object of the invention to provide a composite fiber having an inorganic core and an organic sheath therearound.

Yet another object of the invention is to provide apparatus for producing composite fibers including a bushing having staggered, equally-spaced orifices therein.

Still another object of the invention is to provide apparatus for producing composite fibers including an applicator having a multiplicity of grooves, one for each fiber, and means for individually supplying coating material to each of the grooves.

A further object of the invention is to provide an applicator having a multiplicity of grooves for individual or small groups of fibers with means for retracting the applicator from the fibers, means for moving the applicator up near a bushing from which the fibers are attenuated, and means for moving the applicator into engagement with the fibers.

Yet a further object of the invention is to provide apparatus for producing composite fibers including a curing oven having means for being moved from a side position to an operating position receiving a fan of the fibers and with a side slot through which the fibers are received.

Still a further object of the invention is to provide apparatus for producing composite fibers including two parallel tip sections of one bushing or of separate bushings with two parallel applicators and means for moving the applicators simultaneously into and out of engagement with the fibers.

Many other objects and advantages of the invention will be apparent from the following detailed description of preferred embodiments thereof, reference being made to the accompanying drawings, in which:

FIG. 1 is a somewhat schematic front view in elevation of apparatus according to the invention for producing composite fibers;

FIG. 2 is a somewhat schematic side view in elevation of the apparatus of FIG. 1;

FIG. 3 is a somewhat schematic bottom view of a bushing of FIGS. 1 and 2;

FIG. 4 is an enlarged, front view in elevation, with parts broken away, of a coating material applicator employed below the bushing;

FIGS. 5 and 6 are views in transverse cross section taken along the lines 5—5 and 6—6 of FIG. 4;

FIGS. 7-10 are somewhat schematic side views in elevation of the applicator with supporting and guiding means for positioning the applicator in four different positions with respect to filaments or fibers being attenuated from the bushing;

FIG. 11 is a top view of an oven shown in FIGS. 1 and 2;

FIG. 12 is a side view in elevation of a gathering wheel employed with the apparatus of FIGS. 1 and 2;

FIG. 13 is a view in horizontal cross section taken along the lines 13—13 of FIG. 12;

FIG. 14 is a front view in elevation, with parts broken away, of a modified coating material applicator especially designed for coating groups of fibers rather than individual ones;

FIG. 15 is a fragmentary view in transverse cross section taken along the line 15—15 of FIG. 14;

FIG. 16 is a front view in elevation of modified applicators for coating fibers attenuated from two tip sections of one bushing or of two bushings;

FIG. 17 is a plan view of the applicators of FIG. 16;

FIG. 18 is a left end view in elevation of the applicators of FIG. 16; and

FIG. 19 is a view similar to FIG. 18 but with the applicators in a forward, operating position and further showing the two tip sections.

Referring to FIGS. 1 and 2, inorganic fibers or filaments 20 are attenuated from a bushing 22 and are coated with sheaths of organic material at an applicator 24. Composite filaments or fibers 26, in the shape of a fan, are then cured and/or dried in an oven 28 prior to being gathered into a strand 30 by gathering means in the form of a wheel or shoe 32. The strand 30 is then wound into a package 34 on a collet 36 of a winder 38 having a level winding device 40, as is well known in the art.

The resulting composite fibers and strands thereof have advantages of both organic fibers and inorganic ones. From the organic standpoint, the fibers can be dyed and a color can even be added at the applicator 24. The fibers also can be heat-set and, in general, are more easily handled than glass in textile processes because less wear is produced on components such as guide eyes with which the bare glass fibers would otherwise directly come into contact, and the composite filaments can also be carded more easily than glass. The relatively heavy plastic sheaths on the inorganic fibers increase the abrasion resistance of the fibers because they do not rub on one another and also breakage of the fibers is substantially reduced because the fibers cannot be bent to the extent otherwise possible without the sheath thereon, and caused to break. With the inorganic, glass core, the composite fibers are much stronger than organic ones and also have substantially increased dimensional stability. The composite fibers can be employed in twist frames and strands can be made into cloth, rugs, etc. In general, they can be used substantially wherever textile fibers are employed.

The organic sheath can be either smooth or rough and beady, depending upon the type of plastic material employed. For producing a smooth coating, an acrylic resinous material can be used while for the beady coating, a polyester resinous material can be used. The acrylic is water-soluble and non-flammable, as well as being inexpensive. However, from a broad standpoint, substantially any solvent-based, and specifically water-soluble, coating can be employed.

Referring now in more detail to the components of the apparatus of FIGS. 1 and 2, the bushing 22 can be of a basically conventional design and includes platinum-alloy side walls 42 and end walls 44, which are heated electrically through ears 46. Referring also to FIG. 3, the bushing 22 includes an elongate bottom wall 48, of a platinum alloy, having a multiplicity of bushing tips 50 forming orifices 52. In some instances, the orifices 52 can be formed directly in the bottom wall 48 with the tips 50 being eliminated.

To provide proper spacing for the filaments 20 attenuated from the orifices 52, the orifices are located in slanted, staggered relationship as shown in FIG. 3. The spacing of the orifices is such that lines drawn through the centers of the orifices and perpendicular to a line parallel to the longitudinal extent of the bottom wall 48 are equally spaced apart, as shown. Cooling fins 54 can be located between the slanted rows of orifices 52 with these fins extending diagonally outwardly from a cooling manifold 56 through which a coolant is supplied by lines 58. Such cooling fins are known in the art.

Referring more particularly to FIGS. 4-6, the applicator 24 includes a generally cylindrical body 60 of a graphite or similar carbon-containing material having gathering grooves 62 located in a longitudinally-extending ridge 64 along the front thereof. There is one of the grooves 62 for each of the bushing orifices 52, in this instance, and the grooves are spaced apart a distance substantially equal to the spacing of the lines taken centrally through the orifices 52 and extending perpendicular to the longitudinal extent of the bushing. By way of example, with the bushing bottom 48 having 40 longitudinal rows and five transverse rows of the orifices 52, there are 200 of the grooves 62 in the ridge 64. With the spacing of the orifices being 0.0625 inch, the spacing of the grooves 62 can be slightly less than this, e.g. 0.0615 inch. The purpose of the slightly closer spacing of the grooves 62 will be discussed subsequently.

The grooves are formed completely around the cylindrical body 60 but only the grooves 62 in the ridge 64 are functional, the annular grooves being conveniently formed on a lathe. The upper ends of the grooves 62 terminate in a longitudinally-extending recess 66 while the lower ends of the grooves 62 terminate at an angular planar surface 68. A manifold supply chamber 70 extends longitudinally through the applicator body 60 and has a multiplicity of transverse passages 72 individually communicating with the grooves 62 to assure a supply of coating material for each of the grooves 62. With one of the filaments 20 in each of the grooves, it is assured that the filament will be fully covered with the organic coating material. However, it has been found that as many as 13 filaments can be coated in each groove with full coating of each filament being achieved. Another grooved applicator which can be used to apply the organic coating is shown in a copending patent application of J. L. Kane, entitled "Coating Material Applicator", and filed on even date herewith.

Referring to FIG. 4, coating material is supplied to the manifold supply chamber 70 through a line 74 to supply coating material under pressure to the applicator 24. The material can be supplied from a suitable source 76 through a metering pump 78 which can control accurately the amount of coating material supplied to the chamber 70. With the coating material being under a slight pressure, and with the transverse passages 72 provided for each of the grooves 62, it is assured that the coating material will be supplied to each of the grooves 62 and that this coating material will be applied to one of the filaments 20. Hence, virtually all of the coating material supplied to the applicator 20 by the metering pump 78 will be applied to the filaments.

A cooling line 80 extends through the supply chamber 70 and directs a coolant therethrough to maintain the coating material at a desired temperature and viscosity. When the applicator 24 is not in use, flushing liquid or water can be supplied through a line 82 to flush the central chamber 70, the passages 72, and the grooves 62. This water can be caught in a drain pan mounted under the applicator 24 but positioned so as not to interfere with the filaments being coated.

From time-to-time during the operation of the bushing 22 and the attenuation of the filaments 20, one or more filaments are interrupted, requiring that the operation be stopped and restarted. Such an interruption, for example, may occur from a seed or stone temporarily blocking one of the orifices 52, or one of the filaments 20 might break at the applicator 24 or at some other point in the apparatus. When the operation must be stopped and restarted, the process would be impractical from a commercial standpoint if the filaments 20 had to be individually realigned and positioned in the corresponding ones of the grooves 62. However, it has been discovered that the applicator 24 can be retracted from the filaments 20, raised, and moved back into alignment and engagement with the filaments immediately below the bushing bottom 48 when the bushing is restarted. When so engaged, the applicator is then moved downwardly to its original coating material applying position and the operation begun again. After the applicator 24 is retracted, the portions of the filaments above the breaks are drawn downwardly by an operator and when all of the filaments are continuous and being attenuated again, they can be gathered at the gathering means 32 and wound by the winder 38. After being raised, the applicator 24 is then moved forwardly to receive one of the filaments 20 in each of the grooves 62 and lowered to the operating position.

Referring to FIGS. 7-10, to accomplish this manipulation of the applicator 24, the applicator body 60 is mounted on suitable end brackets 84 which have depending portions 86 mounted on guide rods 88 received and slidably supported by bearing blocks 90 and 92. An end frame 94 connects the guide rods 88 and is connected at a central point to a piston rod 96 of a fluid-operated cylinder 98. Fluid under pressure can be supplied to both ends of the cylinder 98 to move the applicator toward and away from the filaments 20.

The cylinder 98 is mounted under a horizontal platform or plate 100 connected by braces 102 to bearings 104 and 106 which slidably support the plate 100 on vertical guide rods 108. A piston rod 110 of an upright fluid-operated cylinder 112 connects with the plate 100 and moves it, along with the applicator 24 and the associated horizontal supporting assembly, in a vertical direction.

With the applicator 24 in its operating position, as shown in FIG. 10, if a break-out occurs in one or more of the filaments 20, the rod end of the cylinder 98 is supplied with fluid pressure to retract the applicator 24 from the filaments to the retracted position of FIG. 7. Subsequently, the blind end of the vertical cylinder 112 can be supplied with fluid pressure to raise the assembly up to a position where the applicator 24 is near the bushing tips but still retracted from the filaments 20, as shown in FIG. 8. When the filaments have been collected and restarted to once again form the fan, the blind end of the horizontal cylinder 98 is supplied with fluid to move the applicator 24 into engagement with the filaments, as shown in FIG. 9. With the applicator body 60 located close to the orifices 52, when it is moved forwardly, the filaments 20 will be aligned with and received in the corresponding grooves 62 so that one filament will be in each groove. This is made possible by the fact that the applicator is close to the orifices 52 and the filaments will move downwardly in a steady, unwavering line, there being an absence of turbulence in this area. Because the filaments move in a conveying manner, the grooves 62 are slightly closer together than the spacing of the orifices 52 to provide the proper filament alignment, as discussed earlier. The applicator 24 is then moved down to the operating position of FIGS. 1, 2 and 10, by supplying the fluid under pressure to the rod end of the vertical cylinder 112. The applicator can then remain in this position until a break-out or interruption occurs again.

The coated filaments of the fan 26 must be substantially cured or dried before being collected together by the gathering wheel 32. Otherwise, the coating or sheath on the individual filaments will adhere together and form a relatively stiff strand. For this reason, the oven 28 is located immediately under the applicator 24 and is capable of curing the coating material even though the coated filaments are subjected to the heat for only 0.2 second when traveling at 2,000 fpm through a six-foot high oven. Referring to FIGS. 1, 2, and 11, the oven 28 includes a main housing 114 having a vertical side slot 116 extending the full height along the right-hand edge, as viewed in FIG. 1. A closure strip 118 covers this slot, when shut, being pivotally connected by a piano hinge 120 to the housing along one edge of the slot. The top of the housing is similarly closed off by two closure strips 122 and 124 hinged to the housing at 126 and 128. The closure strips 122 and 124 have central notches therein forming an elongate rectangular opening 130 which receives the fan of the coated filaments 26. A slide damper 131 also has a notch to reduce the area of the discharge opening of the oven 28.

Within the housing 114 are two heating panels 132 spaced apart about one-half to three-quarters inch to receive the fan of the filaments. The closer the panels are to the filaments, the greater will be the curing effect. The heating panels 132 can have a plurality of electrical elements over the facing surfaces thereof with the elements concentrated more near the vertical edges. The exhaust fumes from the oven can be carried away through a flexible exhaust duct 134 which communicates with portions of the entrance and exit ends of the oven 28 through side ducts 136. Cool air is also drawn across the lower end of the filament fan by the exhaust duct 134, the air being drawn in a cooling tube 137.

In the event of a break-out and a restart of the filaments, it is important that the oven 28 can be moved out of the way. For this purpose, the upper portion of the oven is mounted by the two rollers 138 and 140 on a horizontally-extending track 142 while a central roller 144 at the bottom portion of the oven bears against a track 146. To move the oven 28 out of the way, the upper cover strips 122 and 124 are swung open, along with the vertical side strip 118, and the slide damper 131 is retracted. The oven can then simply be pushed to the side, toward the left to FIG. 1. The flexible exhaust duct 134 and suitable flexible electric lines enable this movement of the oven. When the bushing is to be placed in operation again, the filaments are restarted and gathered around the winder. When the operation is satisfactory, the oven is pushed back into place with the closure strips again closed to provide a relatively turbulent-free atmosphere within the oven, in the passage formed between the panels 132. By way of illustration, the temperature in the center of the oven between the panels can be from 500°-700° F.

Below the oven 28, the filaments are gathered into the strand 30 by the gathering means 32 which is specifically shown as a wheel or roll 148 in FIGS. 12 and 13. This roll can also be of a graphite material and have a groove 150 extending completely around the perimeter although only a portion of that is functional. A size passage 152 communicates with the functional portion of the groove 150 with size being supplied through a transverse passage 154 and a supply line 156 from a suitable source. The size is important to hold the coated filaments together in the form of the strand 30 to facilitate further processing thereof. When the package 34 on the collet 36 reaches a desired size, it can be removed for subsequent processing and another package started.

Rather than coating the individual filaments 20, groups of the filaments can be coated; it has been found that each filament can be fully coated if the group does not exceed thirteen filaments, with five to thirteen being preferred. For coating groups of filaments, the bushing tips and orifices can be arranged in transverse rows which are perpendicular to the longitudinal extent of the bushing bottom, rather than being staggered as in FIG. 3. For example, with a 50-hole bushing, the orifices can be arranged in ten transverse rows having five filaments each. The five filaments in each transverse row can then be gathered into one group and coated in one notch of an applicator.

An applicator 158 designed specifically for the purpose of coating groups of filaments is shown in FIGS. 14 and 15. The applicator 158 is similar in many respects to the applicator 24, but has larger notches 160 to receive the groups or bundles of filaments. The applicator 158 can be made of the same material as the applicator 24. With a 50-hole bushing, there are ten of the notches 160, each of which receives five filaments from one transverse row of bushing orifices. In practice, the applicator 158, in the form shown, is only about one-third the size of the applicator 24. It can be mounted on supports similar to those of FIGS. 7-10 to facilitate restarting of the bushing when a break-out occurs.

Each of the notches 160 communicates with a central manifold chamber of passage 162 through a transverse passage 164. The coating material is supplied from the right end through a threaded opening 166 from a suitable source by a metering pump similar to that of FIG. 4. Flushing liquid can be supplied through the same opening and, in this instance, the coating material in the chamber 162 is not cooled. Consequently, the applicator 158 need only be supported from the right end with the left end being free. A suitable drain trough can be located below the applicator as is true of the applicator 24.

To achieve a greater output and, therefore, lower cost for the fibers according to the invention, two adjacent tip sections of one or of two bushings and two applicators can be employed at one station. Referring to FIGS. 16-19, and particularly FIG. 19, two adjacent, parallel tip sections 168 and 170 are provided with two applicators 172 and 174. In this instance, bushing tips 176 and 178 and orifices formed therein of the tip sections 168 and 170 are arranged in transverse rows which are perpendicular to the longitudinal extent of the bushing bottom, rather than being staggered. With five of the bushing tips and orifices in each transverse row, as shown, five filaments 180 and 182 from each transverse row can be gathering into one group or bundle and coated in each notch of the applicators 172 and 174. For this purpose, the applicators 172 and 174 can be similar to the applicator 158, having larger notches than those of the applicator 24, to receive the groups or bundles of filaments. The applicators 172 and 174 are also similar to the applicator 158 in that the coating material is supplied from only the one end to leave the other end free. This enables the fans of the filaments 180 and 182 to be more easily manipulated, particularly the fan for the filaments 182 which extend between the applicators 172 and 174. The only other difference between the applicators 172 and 174 and the applicator 158 is that the applicator 172 has a longer supply end so that the notched portions of both of the applicators 172 and 174 will be in alignment with one another, shown particularly in FIGS. 16 and 17, and with the filaments 180 and 182 of both of the tip sections 168 and 170.

The forward or upper applicator 172 is mounted on a supporting post 184 which extends upwardly from a lower platform 186. This has lower brackets 188 and 190 carrying bearings 192 and 194 which enable the platform 186 to slidably supported on horizontal guide rods 196 and 198 which extend from rear mounting plate 200. A fluid-operated cylinder 202 also extends forwardly from the rear mounting plate 200 and has a piston rod 204 connected to a depending flange 206 located near the front of the platform 186. The platform 186 and the applicator 172 thereby can be moved forward and rearwardly as fluid is supplied to the blind end and the rod end of the cylinder 202.

The rear or lower applicator 174 is mounted on a supporting post 208 which extends upwardly from an upper platform 210. This has lower brackets 212 and 214 which are slidably mounted on horizontal guide rods 216 and 218 which are affixed in end supports 220 and 222 located on the lower platform 186. This enables the upper platform 210 along with the post 208 and the applicator 174 to slide forwardly and rearwardly relative to the lower platform 186 as well as relative to the mounting plate 200.

The applicator 174 is moved from a filament-engagement position as shown in FIG. 19 to a retracted position as shown in FIG. 18 simultaneously with corresponding movement of the applicator 172. To accomplish this, a connecting link 224 is pivotally mounted on a pin or stub shaft 226 extending from a side mounting plate 228 which is affixed to and extends forwardly of the mounting plate 200. An intermediate portion of the link 224 has a longitudinally-extending slot 228 which receives a pin 230 extending outwardly from the adjacent edge of the lower platform 186. An upper end of the link 224 also has a longitudinally-extending slot 232 which receives a pin 234 extending outwardly from the adjacent edge of the upper platform 210. When the applicators are in the retracted position of FIG. 18, for example, and fluid under pressure is supplied to the blind end of the cylinder 202, the lower platform 186 moves forwardly and the pin 230 in cooperation with the slot 228 moves the link 224 in a clockwise direction, as viewed in FIGS. 18 and 19. The engagement of the upper pin 234 with the upper slot 232 then causes the platform 210 to move forwardly. With the distance between the pins 226 and 234 approximately being twice the distance between the pins 226 and 230, the upper platform 210 along with the applicator 174 moves horizontally about twice the distance that the upper applicator 172 moves. The linkage arrangement can be altered as desired to fit the particular installation.

The applicators, along with the mounting plates 200 and 228, can be mounted on vertical guide rods and moved vertically by a pneumatically-operated cylinder, similar to those of FIGS. 7-10. The applicators can then be moved up and down toward and away from the bushings in the same manner as before, with the difference being in the simultaneous horizontal movement between the forward and retracted positions.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. Apparatus for coating filaments comprising an applicator having an elongate body with a central supply chamber extending therethrough, a plurality of transverse grooves positioned in a common plane on an outer surface of said body, said body having a plurality of transverse passages, each of said passages connecting said chamber with one of said grooves, means for supplying liquid coating material to said chamber under pressure, a bushing having a bottom with a predetermined number of orifices from which the filaments are attenuated, said orifices being staggered so that lines taken centrally through the orifices and perpendicular to a line parallel to the longitudinal extent of the bushing bottom are equally spaced.

2. Apparatus according to claim 1 characterized by the number of grooves in said applicator equalling the number of orifices.

3. Apparatus for forming and coating filaments comprising a bushing having a plurality of orifices from which the filaments are attenuated in a downward direction, said orifices being positioned in staggered relationship such that lines taken centrally through said orifices and perpendicular to the longitudinal extent of the bushing are equally spaced, an applicator comprising a body having a supply chamber, a plurality of grooves positioned in a common generally vertical plane, there being one of said grooves for each of said orifices, and passage means connecting said supply chamber with said grooves, means below said applicator for gathering said filaments into a strand, means for packaging the strand, and an oven between said applicator and said gathering means, said oven having passage extending therethrough with heating means on opposite sides of said passage.

4. Apparatus according to claim 2 characterized by said transverse grooves in said body being equally spaced and substantially equal to the spacing of said lines.

5. Apparatus according to claim 4 characterized by the spacing of said grooves being slightly less than the spacing of said lines.

6. Apparatus for coating fibers comprising an applicator for applying coating material to a plurality of the fibers located in a common plane, means spaced from said applicator for collecting the coated fibers, and an oven, said oven comprising a housing, heating panels within said housing and forming a passage extending from one end of the housing to the other and having an elongate transverse cross-sectional shape, said housing having a slot communicating with said passage substantially over the length of said housing, and means for movably supporting said oven between a position in which said passage is located between substantially aligned with said applicator and said collecting means and a position in which said housing is to one side of said applicator and said collecting means.

7. Apparatus according to claim 6 characterized by said housing having a movable closure strip for closing off said slot when said oven is in the aligned position.

8. Apparatus according to claim 6 characterized by said oven having an entrance opening at the end nearer said applicator communicating with said passage and an exit opening at the opposite end, and means for partially closing off said entrance opening when said oven is in the aligned position.

9. Apparatus according to claim 8 characterized further by means for partially closing off said exit opening when said oven is in the aligned position.

10. Apparatus according to claim 6 characterized by a flexible exhaust duct connected to said housing and communicating with entrance and exit portions of said passage.

11. Apparatus according to claim 6 characterized by said movable supporting means comprises generally horizontally-extending track means, and roller means carried by said housing and engaging said track means.

12. Apparatus according to claim 3 characterized by said grooves being equally spaced substantially equal to the spacing of said lines.

13. Apparatus according to claim 12 characterized by the spacing of said grooves being slightly less than the spacing of the lines.

14. Apparatus according to claim 3 characterized by said passage means comprises a transverse passage connecting said supply chamber with each of said grooves.

15. Apparatus according to claim 3 characterized by means for moving said oven between a position in which the passage is aligned with said applicator and said gathering means and a position to the side of them.

16. Apparatus according to claim 15 characterized by said oven having a flexible exhaust duct communicating with said passage.

17. Apparatus according to claim 15 characterized by means for partially closing off the entrance and exit ends of said oven passage when said oven is in the aligned position.

18. Apparatus according to claim 3 characterized by said oven having duct means communicating with said exhaust duct to connect the exhaust duct with entrance and exit ends of said oven passage.

19. Apparatus according to claim 18 characterized by a cooling duct at the exit end of said passage and communicating with said duct means to direct ambient air across the filaments at the exit end of said passage.

* * * * *